Figure 1:
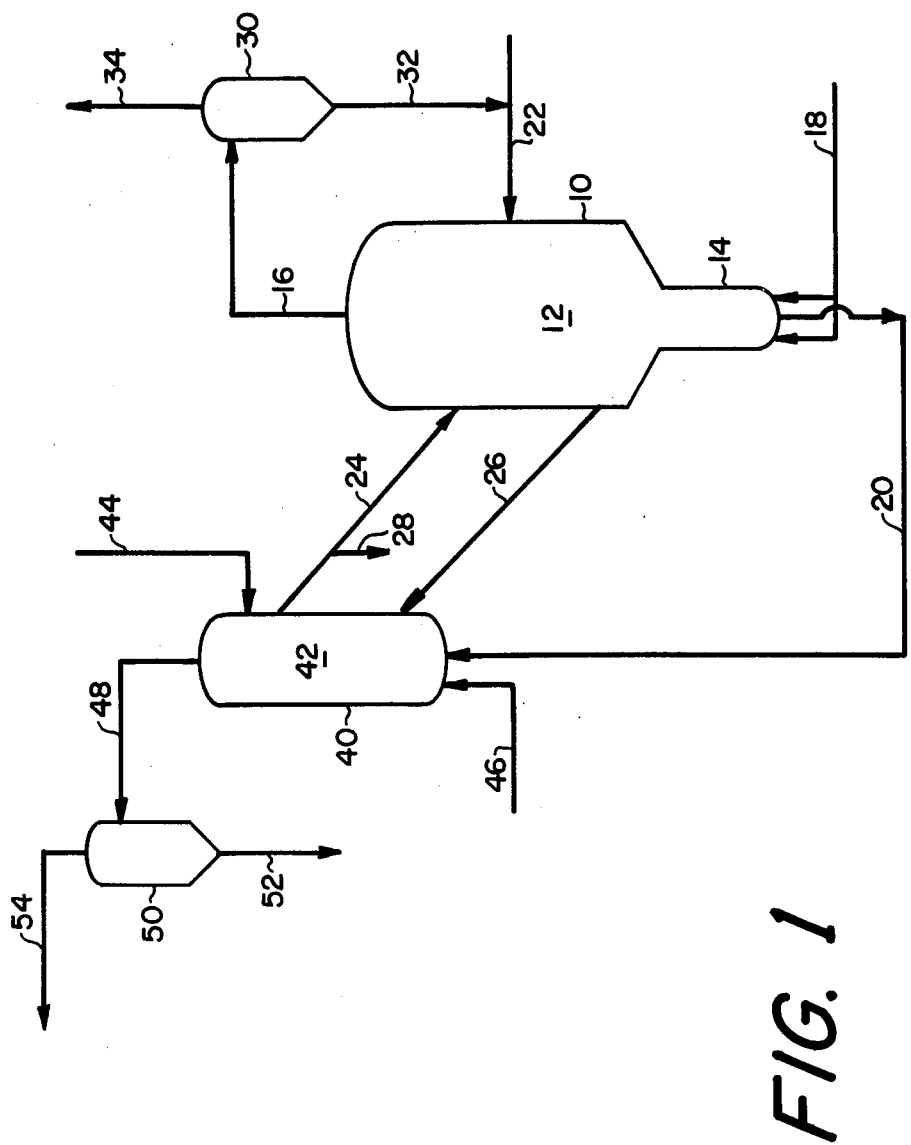

United States Patent [19]

Lancet et al.

[11] 4,284,528

[45] Aug. 18, 1981

[54] SYNTHETIC $CO_2$ ACCEPTOR

[75] Inventors: Michael S. Lancet; George P. Curran, both of Pittsburgh, Pa.

[73] Assignee: Conoco Inc., Stamford, Conn.

[21] Appl. No.: 124,199

[22] Filed: Feb. 25, 1980

Related U.S. Application Data

[62] Division of Ser. No. 20,005, Mar. 12, 1979, Pat. No. 4,231,760.

[51] Int. Cl.³ .................. B01J 27/20; B01J 20/10; B01J 20/04; C10J 3/12
[52] U.S. Cl. .................. 252/443; 48/197 R; 48/202; 106/73.5; 252/373; 423/230; 423/430
[58] Field of Search ............ 48/197 R, 202, 206; 252/443, 457, 373; 201/38; 423/230, 430, 232, 233, 637, 640; 106/63, 69, 73.5

[56] References Cited

U.S. PATENT DOCUMENTS

| | | | |
|---|---|---|---|
| 2,442,191 | 5/1948 | Black | 252/455 R |
| 2,456,072 | 12/1948 | Marisic | 252/455 R |
| 2,705,672 | 4/1955 | Gorin | 48/206 |
| 3,194,644 | 7/1965 | Gorin et al. | 48/197 R |
| 3,516,808 | 6/1970 | Curran et al. | 423/640 |
| 4,025,460 | 5/1977 | Veda et al. | 252/457 |
| 4,191,538 | 3/1980 | Gorin | 48/197 R |

OTHER PUBLICATIONS

*Elements of Optical Minerology*–Winchell, 4th Edition, Part II–1951–p. 516–John Wiley & Sons Inc.

*Primary Examiner*—P. E. Konopka
*Attorney, Agent, or Firm*—F. Lindsey Scott; William A. Mikesell, Jr.

[57] ABSTRACT

A synthetic $CO_2$ acceptor consisting essentially of at least one compound selected from the group consisting of calcium oxide and calcium carbonate supported in a refractory carrier matrix, the carrier having the general formula $Ca_5(SiO_4)_2CO_3$. A method for producing the synthetic $CO_2$ acceptor is also disclosed.

5 Claims, 2 Drawing Figures

SYNTHETIC CO2 ACCEPTOR

This invention resulted from work done pursuant to a contract with the Energy Research and Development Administration (now the Department of Energy).

This is a division, of application Ser. No. 020,005, filed Mar. 12, 1979, now U.S. Pat. No. 4,231,760.

This invention relates to synthetic $CO_2$ acceptors for use in the reaction of steam and carbonaceous fuels to produce synthetic gaseous fuels.

In view of the continuing and well-know shortage of natural gas, a continuing effort has been directed to the development of processes whereby synthetic gaseous fuels can be produced from other more abundant fuels such as coal and the like. One such process comprises the reaction of steam with carbonaceous fuels, such as coal, in the presence of a $CO_2$ acceptor material such as calcium oxide to produce synthetic fuels which are rich in hydrogen. Some processes of this type are disclosed in the following United States patents:

U.S. Pat. No. 2,654,661 to Gorin
U.S. Pat. No. 2,654,662 to Gorin
U.S. Pat. No. 2,654,663 to Gorin
U.S. Pat. No. 2,682,455 to Gorin
U.S. Pat. No. 2,682,456 to Gorin
U.S. Pat. No. 2,682,457 to Gorin
U.S. Pat. No. 2,705,672 to Gorin
U.S. Pat. No. 2,781,248 Gorin
U.S. Pat. No. 2,807,529 to Tarbox
U.S. Pat. No. 3,108,857 to Gorin et al.
U.S. Pat. No. 3,115,394 to Gorin et al.
U.S. Pat. No. 3,188,179 to Gorin
U.S. Pat. No. 3,194,644 to Gorin et al.
U.S. Pat. No. 3,516,808 to Curran et al.

In the preparation of the present application, the following references were also considered.

U.S. Pat. No. 1,574,380 to Endres
U.S. Pat. No. 2,057,402 to Tropsch
U.S. Pat. No. 2,234,367 to Chesny
U.S. Pat. No. 3,141,729 to Clarke
U.S. Pat. No. 3,847,837 to Boryta
U.S. Pat. No. 3,865,924 to Gidaspow These patents are hereby incorporated by reference.

In the practice of such processes, a continuing problem has been the tendency for the calcium oxide to become inactive after several cycles through the process. While there may be many contributing factors to the inactivity of the calcium oxide after repeated cycling through the process, at least one major factor is the growth of the crystal size of the calcium oxide to the extent that the surface area is greatly reduced. When such inactivity occurs, it is necessary to remove the calcium oxide from the process and regenerate it by melting, chemical processing, or the like. To minimize the necessity for such regeneration, efforts have been directed to the development of synthetic $CO_2$ acceptors which can be regenerated during the process or which do not require regeneration at such frequencies.

In accordance with the present invention, a synthetic $CO_2$ acceptor, consisting essentially of at least one calcium compound selected from the group consisting of calcium oxide and calcium carbonate, supported in a refractory carrier matrix wherein the carrier has the general formula $Ca_5(SiO_4)_2CO_3$ has been found effective.

Figure 2:
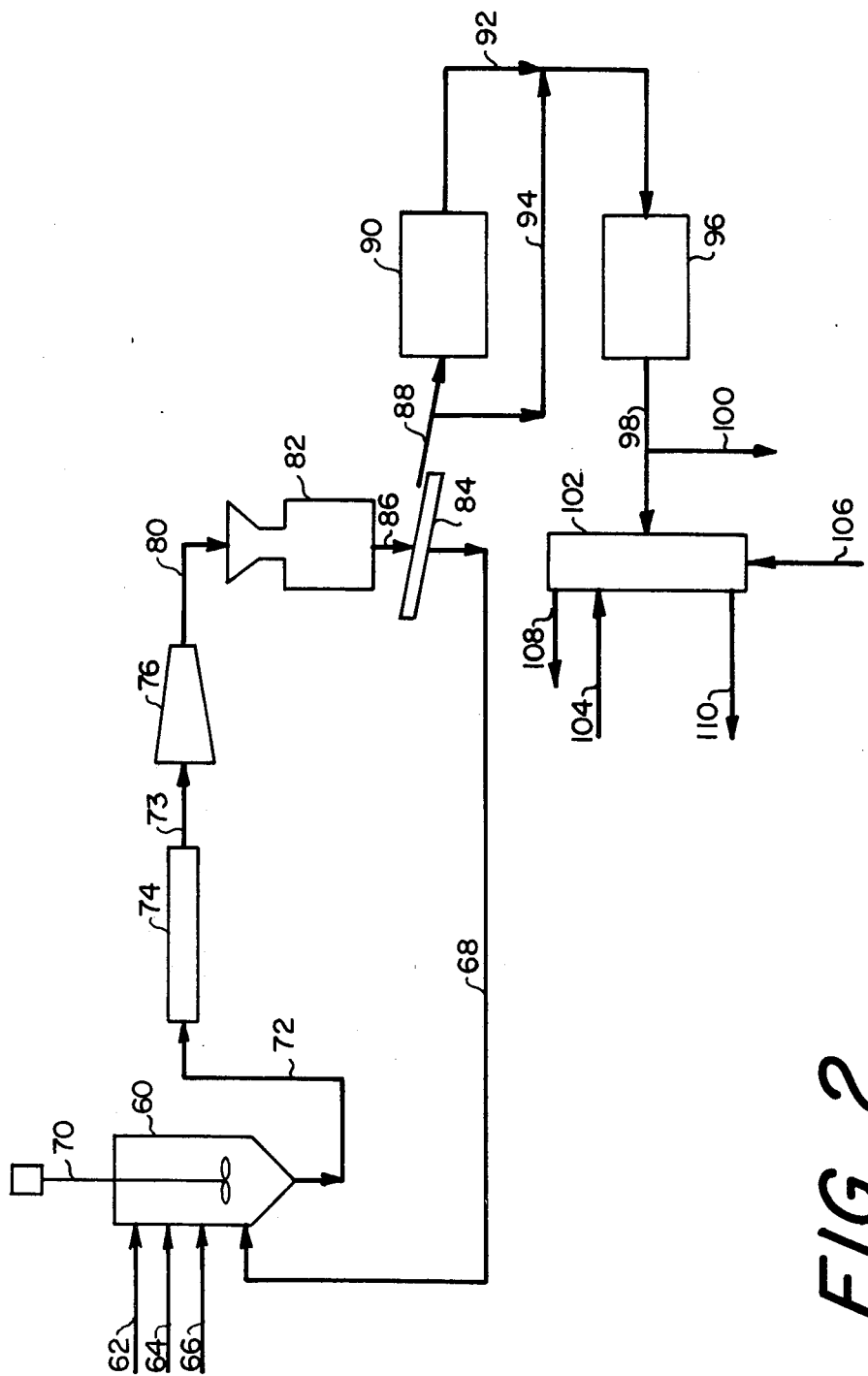

FIG. 1 is a schematic diagram of a process wherein the use of the synthetic acceptor of the present invention is effective; and FIG. 2 is a schematic diagram of a process for producing the synthetic acceptor of the present invention.

In FIG. 1, a reactor 10 is shown. Reactor 10 contains a fluidized bed 12 and includes a standpipe 14 which comprises a reduced diameter section positioned at the lower portion of reactor 10. A gas inlet 18 for the injection of fluidizing gas which is normally steam is provided for maintaining fluidized bed 12 in a fluidized condition. Feed such as coal, char or the like is introduced into reactor 10 through a line 22 and regenerated or fresh $CO_2$ acceptor is introduced into reactor 10 through a line 24. A product gaseous stream is recovered from reactor 10 via a line 16 and passed to a solids/gas separating means such as a cyclone 30 from which the gaseous mixture is recovered through a line 34 and passed to further processing with the entrained solids being recovered from cyclone 30 through a line 32 and passed to line 22 for recycle to reactor 10. A stream comprising calcium carbonate is recovered from the lower portion of reactor 10 via a line 20 and passed to a regenerator 40 which contains a fluidized bed 42. An air inlet line 46 is provided for the introduction of free oxygen-containing gas into fluidized bed 42 and char is introduced into fluidized bed 42 via a line 26 from reactor 10. The amount of oxygen introduced into fluidized bed 42 is controlled to regulate the temperature in fluidized bed 42 and a flue gas mixture which contains, as entrained solids, a major portion of the ash produced by the combustion of coal in reactor 10 is recovered from regenerator 40 through a line 48 and passed to a solids/gas separator such as a cyclone 50 where a flue gas stream 54 is separated and passed to waste, further processing or the like with a solids stream comprising ash, calcium sulfide and the like being recovered through a line 52 and passed to waste disposal, further processing or the like. Fresh acceptor may be introduced into regenerator 40, line 24, reactor 10 or line 20 and is shown for convenience as being introduced via a line 44 into regenerator 40. Spent acceptor can also be withdrawn in a similar fashion and is shown for convenience as being withdrawn via a line 28 from line 24. In the operation of the process shown in FIG. 1, a carbonaceous fuel such as coal is injected in an amount sufficient to maintain a fluidized bed of carbonaceous material in reactor 10. The carbonaceous fuel so injected may be char, non-caking coal or the like. Caking coals may also be used, but it may be desirable in some instances to pre-oxidize such coals or the like to avoid the formation of agglomerates in fluidized bed 12. Such pretreatments, and the necessity for such, are well known to those skilled in the art and form no part of the present invention. In reactor 10, the carbonaceous reacts with steam injected through line 18 to produce a gas which is rich in hydrogen. Typically, the gas comprises hydrogen and carbon monoxide in a ratio of approximately 3 mols of hydrogen per mol of carbon monoxide. This ratio is desirable for use in producing synthetic natural gas such as methane or the like. In reactor 10, the reactions occurring can be shown as follows:

$$C + H_2O \rightarrow CO + H_2 \quad (1)$$

$$C + 2H_2O \rightarrow CO_2 + 2H_2 \quad (2)$$

$$CaO + CO_2 \rightarrow CaCO_3 \quad (3)$$

Additional reactions occurring are the shift reaction;

$$CO + H_2O \rightarrow CO_2 + H_2 \quad (4)$$

the formation of methane by reactions such as $$CO + 3H_2 \rightarrow CH_4 + H_2O \quad (5)$$

and the removal of sulfur compounds by reactions such as $$CaO + H_2S \rightarrow CaS + H_2O \quad (6)$$

As is clear to those skilled in the art, a variety of reactions is occurring in reactor 10 and the net result, as indicated, is the production of a synthesis gas which is rich in hydrogen. The reaction of calcium oxide with the carbon dioxide is exothermic and produces sufficient heat to maintain the desired reaction temperature in reactor 10. The calcium carbonate compounds removed via line 20 are passed to regenerator 40 where they are heated to a temperature sufficient to convert the calcium carbonate back to calcium oxide which is then recycled via line 24 to reactor 10. The calcium compounds can be considered as cascading downwardly through fluidized bed 12 as they absorb carbon dioxide and are recovered in a substantially pure form via line 20 since they are particulate in form and are denser than the carbonaceous compounds which are maintained in a fluidized condition by the injection of steam via line 18.

Reaction conditions in reactor 10 are typically below about 1550° F. with the steam pressure in standpipe 14 being controlled at values below about 13 atmospheres. Such is normally necessary since it is desired to minimize or eliminate the melting of the calcium compounds which occurs more readily in the presence of steam because of the formation of a calcium oxide-calcium hydroxide-calcium carbonate low melting eutectic complex in standpipe 14. Reaction conditions in regenerator 40 are desirably a temperature in excess of about 1800° F., typically about 1850° F.

By the use of the synthetic acceptor of the present invention, the steam pressure in standpipe 14 is increased so that the low melting eutetic complex referred to above, forms and is melted. Since the calcium compounds present in the synthetic acceptor are contained in a thermally stable matrix, the calcium compounds, even though melted, remain in discrete particles, i.e. in the thermally stable matrix. Such permits the reactivation of the calcium compounds in the synthetic acceptor with each passage through the process thereby eliminating the need for large quantities of fresh make-up acceptor as has been the case with the naturally-occurring $CO_2$ acceptor materials used previously.

The synthetic acceptor of the present invention is desirably produced by mixing calcium carbonate and silica to produce a mixture containing from about 85 to about 90 weight percent calcium carbonate and from about 10 to about 15 weight percent silica. This mixture is then pelletized by forming an aqueous putty-like mixture and producing particles of a desired size. The particles are then heated to a temperature of at least 1500° F. for at least 30 minutes at a steam pressure of at least about 18 atmospheres and a carbon dioxide pressure of at least about 2 atmospheres to produce the synthetic $CO_2$ acceptor. In some instances it may be desirable to pelletize the mixture and to produce pellets of a larger size than desired which are then ground to a desired size. It may also be desirable to heat the resulting particles to a temperature of at least about 1600° F. at a carbon dioxide pressure of at least about one atmosphere for at least about 30 minutes to partially harden the particles prior to heating under the steam pressure noted above. While in some instances it may not be necessary to heat at varying steam pressures, it is believed that in other instances it may be desirable to utilize the lower steam pressure partial hardening to ensure that the particles remain as discrete particles and the like. The resulting particles comprise a matrix of $Ca_5(SiO_4)_2CO_3$ as a matrix wherein calcium carbonate in an amount up to about 50 weight percent based on the weight of the particles is dispersed. The calcium carbonate positioned in the matrix is the acceptor material and would be calcined to calcium oxide prior to use in reactor 10. In a further variation of the present invention, it may be desirable to further react the surface calcium of the particles so produced with silica in order to increase particle hardness and thereby increase resistance to attrition and also to increase the particle integrity during internal melting of the $CO_2$ acceptor.

FIG. 2 is a schematic diagram of a process for producing the synthetic acceptor of the present invention. A mixing vessel 60 including a mixer 70 is shown and includes a line 62 for the injection of silica, a line 64 for the injection of calcium carbonate and a line 66 for the injection of water. The materials are mixed to produced the calcium carbonate-silica mixture with water being added as desired to form a mixture of the desired consistency. The mixture is then passed through a line 72 to a drier 74 where the composition is dried to the desired water content for extrusion in an extruder 76. The dried mixture is passed from dryer 74 via a line 73 to extruder 76 or in some instances, dryer 74 may be positioned as an integral part of extruder 76. The extrudates are passed via a line 80 to a grinder 82 where they are ground to a desired size and passed downwardly from grinder 82 as shown by arrow 86 to a screen 84 where particles of the desired size are passed via a line 88 to a low pressure furnace 90 where they are heated at a temperature of at least about 1600° F. at a carbon dioxide pressure of at least one atmosphere. Desirably the residence time in furnace 90 is at least about 30 minutes. The partially hardened particles are then passed via a line 92 to a high pressure furnace 96 where they are further treated at a temperature from about 1450° to about 1550° F., a steam pressure from about 18 to about 20 atmospheres, and a $CO_2$ pressure from about 2 to about 3 atmospheres. Desirably the residence time in furnace 96 is at least about 30 minutes. Optionally, low pressure furnace 90 can be bypassed via a line 94 with the particles going directly to high pressure furnace 96. The product is recovered from furnace 96 via a line 98 and a product line 100. In the event that an additional silica hardening is desired, the particles flowing through line 98 may be passed to a vessel 102 which comprises a fluidized bed of silica. Silica is introduced into vessel 102 via a line 104 with fluidizing gas being introduced through a line 106 and recovered through a line 108. Any suitable inert fluidizing gas such as nitrogen may be used. The hardened particles are recovered as a product via a line 110. The separation of particles as recovered through line 110 is well within the skill of those in the art and need not be discussed further. The undersized particles recovered from screen 84 are optionally recycled via a line 68 to mixing vessel 60.

While the present invention has been disclosed by reference to certain of its preferred embodiments, it is pointed out that the embodiments set forth are illustrative rather than limiting in nature and that many variations and modifications are possible within the scope of the present invention. Many such variations and modifications may be considered obvious or desirable to those skilled in the art based upon a review of the foregoing description of preferred embodiments and the following example.

EXAMPLE

A mixture consisting of 87 weight percent calcium carbonate and 13 weight percent finely divided silica was prepared. This mixture was then wetted, partially dried and pelletized at about 5000 p.s.i.g. to produce pellets which were ground to −10 mesh and thereafter heated to 1600° F. under 1 atm. of carbon dioxide for about 60 minutes. The partially hardened material was then treated in a high pressure vessel at about 18 atmospheres of steam plus two atmospheres of carbon dioxide at 1500° F. for 60 minutes. The resulting pellets contain about 40 weight percent free calcium carbonate and are hard, discrete particles. Samples of the particles so produced have been cycled for up to 65 cycles in an automatic cycle tester with virtually no loss in activity. The cycle tester, when used to test dolomite-derived and limestone acceptors, typically shows activities of approximately 10 to 15 percent of the initial values with such materials after similar cycling.

Having thus described the present invention, I claim:

1. A synthetic $CO_2$ acceptor consisting essentially of at least one calcium compound selected from the group consisting of calcium oxide and calcium carbonate supported in a refractory carrier matrix, said carrier having the general formula $Ca_5(SiO_4)_2CO_3$, wherein said calcium compound is present in an amount up to about 50 weight percent, calculated as calcium oxide, based on the weight of the acceptor.

2. A method for producing a synthetic $CO_2$ acceptor, said acceptor comprising a mixture of calcium carbonate and spurrite, $Ca_5(SiO_4)_2CO_3$ said method consisting essentially of:
   (a) mixing calcium carbonate, silica and water to produce a pelletizable mixture containing from about 85 to about 90 weight percent calcium carbonate and from about 10 to about 15 weight percent silica;
   (b) pelletizing said mixture to produce particles of a desired size; and
   (c) heating said particles to a temperature of at least 1500° F. for at least 30 minutes at a steam pressure of at least about 18 atmospheres and a carbon dioxide pressure of at least 2 atmospheres to produce said synthetic $CO_2$ acceptor.

3. The method of claim 2 wherein said pellets are heated to a temperature of at least about 1600° F. at a carbon dioxide pressure of at least one atmosphere prior to the heating step of (c) to partially harden said particles prior to the heating of step (c).

4. The method of claim 2 wherein said carbon dioxide pressure is from about 2 to about 3 atmospheres.

5. The method of claim 2 wherein said synthetic $CO_2$ acceptor of step (c) is further heated in the presence of finely divided silica at a temperature from about 1450° to about 1600° F. at a carbon dioxide pressure of at least 2 atmospheres to further harden said synthetic $CO_2$ acceptor particles.

* * * * *

UNITED STATES PATENT AND TRADEMARK OFFICE
CERTIFICATE OF CORRECTION

PATENT NO. : 4,284,528

DATED : August 18, 1981

INVENTOR(S) : Michael S. Lancet et al.

It is certified that error appears in the above—identified patent and that said Letters Patent is hereby corrected as shown below:

Column 2, line 55, insert -- fuel -- after "carbonaceous".

Signed and Sealed this

Twenty-fourth Day of November 1981

[SEAL]

Attest:

GERALD J. MOSSINGHOFF

Attesting Officer

Commissioner of Patents and Trademarks